(12) United States Patent
Syed et al.

(10) Patent No.: US 8,738,262 B2
(45) Date of Patent: May 27, 2014

(54) DRIVING BEHAVIOR FEEDBACK INTERFACE

(75) Inventors: Fazal Urrahman Syed, Canton, MI (US); Dimitar Petrov Filev, Novi, MI (US); Venkatapathi Raju Nallapa, Dearborn, MI (US); Paul Stephen Bryan, Belleville, MI (US); Ryan J. Skaff, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 13/443,419

(22) Filed: Apr. 10, 2012

(65) Prior Publication Data

US 2013/0173129 A1  Jul. 4, 2013

Related U.S. Application Data

(60) Provisional application No. 61/581,942, filed on Dec. 30, 2011.

(51) Int. Cl.
*G06F 19/00* (2011.01)

(52) U.S. Cl.
USPC .................................. 701/70; 701/1; 340/439

(58) Field of Classification Search
None
See application file for complete search history.

(56) References Cited

U.S. PATENT DOCUMENTS

| | | | |
|---|---|---|---|
| 6,092,021 A | 7/2000 | Ehlbeck et al. | |
| 6,167,357 A | 12/2000 | Zhu et al. | |
| 7,454,962 B2 | 11/2008 | Nishiyama et al. | |
| 7,603,228 B2 | 10/2009 | Coughlin | |
| 7,765,058 B2 | 7/2010 | Doering | |
| 7,798,578 B2 | 9/2010 | Lewis et al. | |
| 8,255,122 B2 * | 8/2012 | Tanaka | 701/48 |
| 2007/0143002 A1 | 6/2007 | Crowell et al. | |
| 2009/0043467 A1 | 2/2009 | Filev et al. | |
| 2009/0105897 A1 | 4/2009 | Breslau et al. | |
| 2009/0326753 A1 | 12/2009 | Chen et al. | |
| 2010/0152949 A1 * | 6/2010 | Nunan et al. | 701/29 |
| 2010/0211259 A1 | 8/2010 | McClellan | |
| 2011/0106334 A1 | 5/2011 | Filev et al. | |

(Continued)

FOREIGN PATENT DOCUMENTS

| | | |
|---|---|---|
| EP | 2036777 B1 | 3/2010 |
| EP | 2332770 A1 | 6/2011 |
| EP | 2332784 A1 | 6/2011 |

OTHER PUBLICATIONS

Ryuichi Kamaga et al., Development of Plug-in Hybrid Control ECU, Fujitsu Ten Tech. J. No. 35, 2010, pp. 10-16.

(Continued)

*Primary Examiner* — Behrang Badii
*Assistant Examiner* — Demetra Smith-Stewart
(74) *Attorney, Agent, or Firm* — David B. Kelley; Brooks Kushman P.C.

(57) ABSTRACT

One or more embodiments of the present application may provide a system and method for monitoring driver inputs and vehicle parameters, assessing a driver's cruising speed behavior, and providing short-term and/or long-term feedback to the driver relating to the driver's cruising speed behavior. The cruising speed behavior feedback can be used to coach future cruising speed behavior that may translate into better long-term driving habits, which in turn may lead to improvements in fuel economy or vehicle range. Moreover, the cruising speed behavior feedback can be adapted to a driver based upon how responsive the driver is to the feedback.

19 Claims, 4 Drawing Sheets

(56) References Cited

U.S. PATENT DOCUMENTS

| | | |
|---|---|---|
| 2011/0153175 A1* | 6/2011 | Zhang et al. .................... 701/70 |
| 2011/0257828 A1 | 10/2011 | Levy et al. |
| 2012/0089423 A1* | 4/2012 | Tamir et al. ....................... 705/4 |
| 2012/0239462 A1* | 9/2012 | Pursell et al. ................ 705/7.38 |
| 2012/0283893 A1 | 11/2012 | Lee et al. |
| 2013/0013348 A1* | 1/2013 | Ling et al. ......................... 705/4 |
| 2013/0110310 A1 | 5/2013 | Young |

OTHER PUBLICATIONS

Office Action dated Aug. 30, 2013 for U.S. Appl. No. 13/443,247, filed Apr. 10, 2012, pp. 1-9.
Office Action dated Oct. 21, 2013 for U.S. Appl. No. 13/443,236, filed Apr. 10, 2012, pp. 1-10.

* cited by examiner

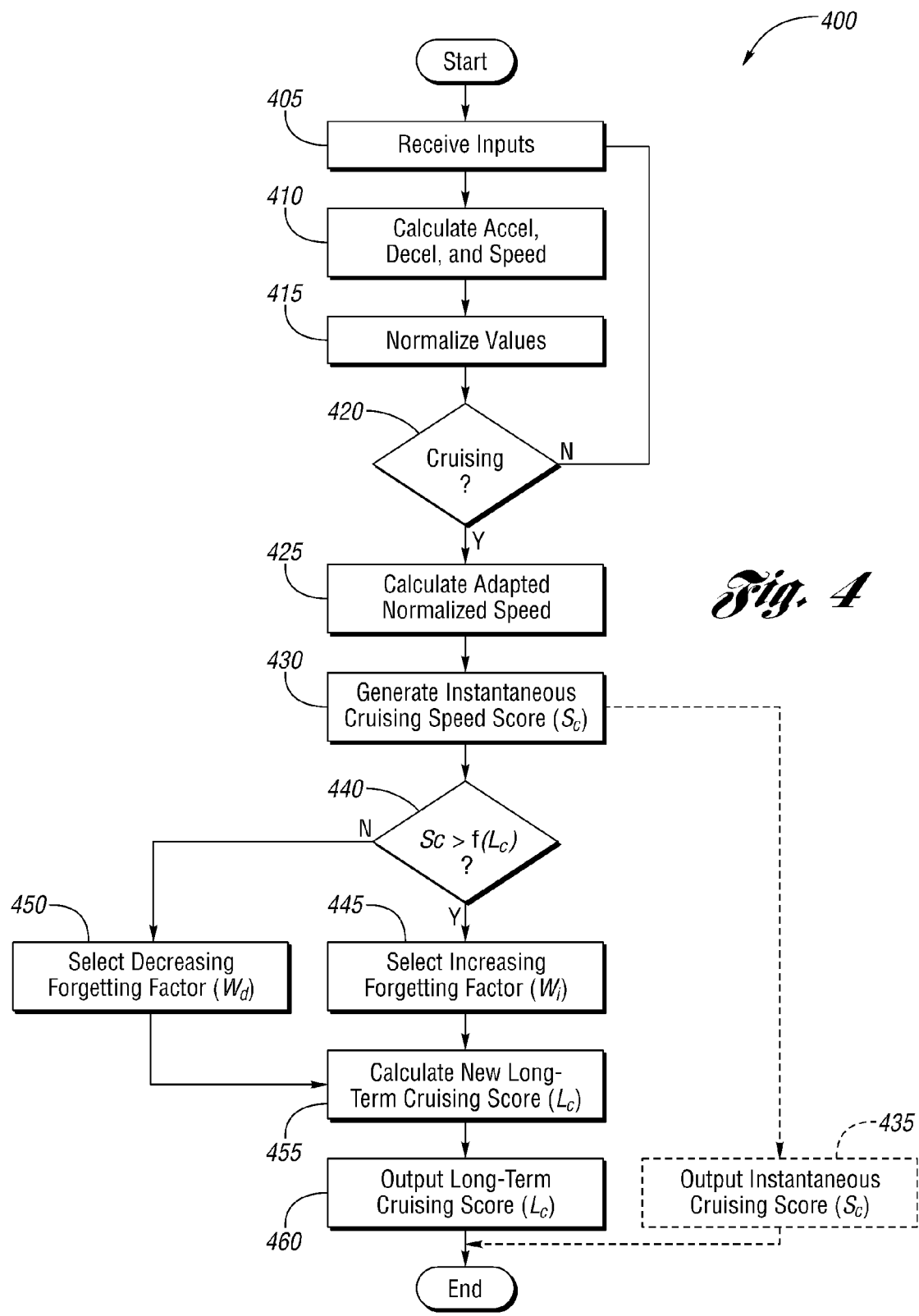

DRIVING BEHAVIOR FEEDBACK INTERFACE

CROSS-REFERENCE TO RELATED APPLICATIONS

This application claims the benefit of U.S. provisional Application No. 61/581,942, filed Dec. 30, 2011, the disclosure of which is incorporated in its entirety by reference herein.

TECHNICAL FIELD

One or more embodiments of the present application relate to a system and method for conveying feedback to a driver on the driver's cruising speed behavior via a user interface.

BACKGROUND

Vehicles include a number of interfaces, such as gauges, indicators, and various displays to convey information to the user regarding the vehicle's operation and its surroundings. With the advent of new technologies, including technologies found in conventional vehicles as well as in hybrid electric vehicles (HEVs), plug-in hybrid electric vehicle (PHEVs) and battery electric vehicles (BEVs), these interfaces have become more sophisticated. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery. Regardless of the vehicle type, fuel economy or range of a vehicle still remains an important metric to most vehicle drivers.

In real world driving conditions, driver behavior remains the primary factor affecting fuel economy or range of a vehicle. It is known that some drivers may not be able to achieve desired fuel economy or range, in part because of driving habits. Although it is clear that driving behavior affects the fuel economy or range of a vehicle, it is often unclear how one should drive by taking powertrain and other environmental factors into account in order to improve fuel economy or range. In many cases, drivers are willing to modify their behavior, but are unable to translate recommended techniques into real changes in their driving habits.

SUMMARY

According to one or more embodiments of the present application, a display control system and method for coaching cruising speed behavior is provided. The control system may include a controller and an interface in communication with the controller. The controller may be configured to receive input indicative of at least vehicle acceleration, vehicle deceleration and vehicle speed. The controller may be further configured to output at least one cruising speed score based upon the input. The interface may be configured to display a cruising speed feedback indicator indicative of the at least one cruising speed score.

The interface may include a cruising speed feedback gauge for displaying the cruising speed feedback indicator. The interface may be configured to adjust the cruising speed feedback indicator within the cruising speed feedback gauge based on the at least one cruising speed score. The at least one cruising speed score indicated by the cruising speed feedback indicator may include one of a long-term cruising speed score and an instantaneous cruising speed score. Moreover, the interface may be further configured to adjust a color of at least a portion of the cruising speed feedback gauge based on the other of the long-term cruising speed score and the instantaneous cruising speed score.

According to one or more embodiments, the controller may generate the instantaneous cruising speed score based upon the vehicle acceleration, the vehicle deceleration and the vehicle speed. In this regard, the controller may normalize one or more of the vehicle acceleration, the vehicle deceleration and the vehicle speed based upon vehicle speed prior to generating the instantaneous cruising speed score. Moreover, the controller may calculate an adapted vehicle speed value prior to generating the instantaneous cruising speed score. The adapted vehicle speed value may be based on the vehicle speed and the long-term cruising speed score. For instance, the adapted vehicle speed value may be calculated by multiplying a normalized vehicle speed value by the long-term cruising speed score.

According to one or more embodiments, the instantaneous cruising speed score may be generated using a look-up table based on the vehicle speed. Furthermore, the long-term cruising speed score may be based at least in part upon the instantaneous cruising speed score, a previous long-term cruising speed score, and a forgetting factor for weighting the instantaneous cruising speed score and the previous long-term cruising speed score. A value associated with the forgetting factor may be based on a comparison of the instantaneous cruising speed score to a function of the long-term cruising speed score.

BRIEF DESCRIPTION OF THE DRAWINGS

FIG. 4 is a simplified, exemplary flow chart depicting a method for conveying cruising speed behavior feedback in accordance with one or more embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One of the main driver factors than can affect the fuel efficiency or range of a vehicle is the driving vehicle cruising speed behavior. Many drivers are often uncertain how they should drive in order to improve fuel economy or range by taking powertrain and other environmental factors into account. Feedback to drivers on their cruising speed behavior can impact or improve their future actions to increase fuel economy or range with minimal, if any, effect on the drivability of the vehicle. Real-time cruising speed behavior feedback can translate into better long-term driving habits.

One or more embodiments of the present application may provide a system and method for monitoring driver inputs and vehicle parameters, assessing a driver's cruising speed behavior, and providing feedback to the driver relating to the cruising speed behavior. The driver cruising speed behavior feedback can be used to coach the driver's future cruising speed behavior. The cruising speed behavior coaching may ultimately lead to improvements in the vehicle's power efficiency when the current cruising speed behavior negatively affects or reduces the power efficiency of the vehicle.

The system can provide relatively short-term feedback or advice relating to a driver's cruising speed behavior. Moreover, the system may monitor the driver's acceptance or rejection of the short-term feedback in order to learn the driver's long-term intentions for using the feedback to modify his or her cruising speed behavior. Further, the system may provide a long-term score relating to the driver's cruising speed behavior that may be based, at least in part, upon the driver's acceptance or rejection of the cruising speed behavior feedback. In this manner, the system can adapt to the driver's long-term intentions regarding use of the cruising speed behavior coaching to modify driving habits and can provide corresponding feedback that may tend to improve the driver's cruising speed behavior gradually over time. According to one or more embodiments of the present application, the long-term score relating to the driver's cruising speed behavior may be used to modify the system's vehicle speed input, which may be used in generating the short-term feedback when vehicle acceleration and deceleration are each below corresponding acceleration and deceleration thresholds.

Figure 1:
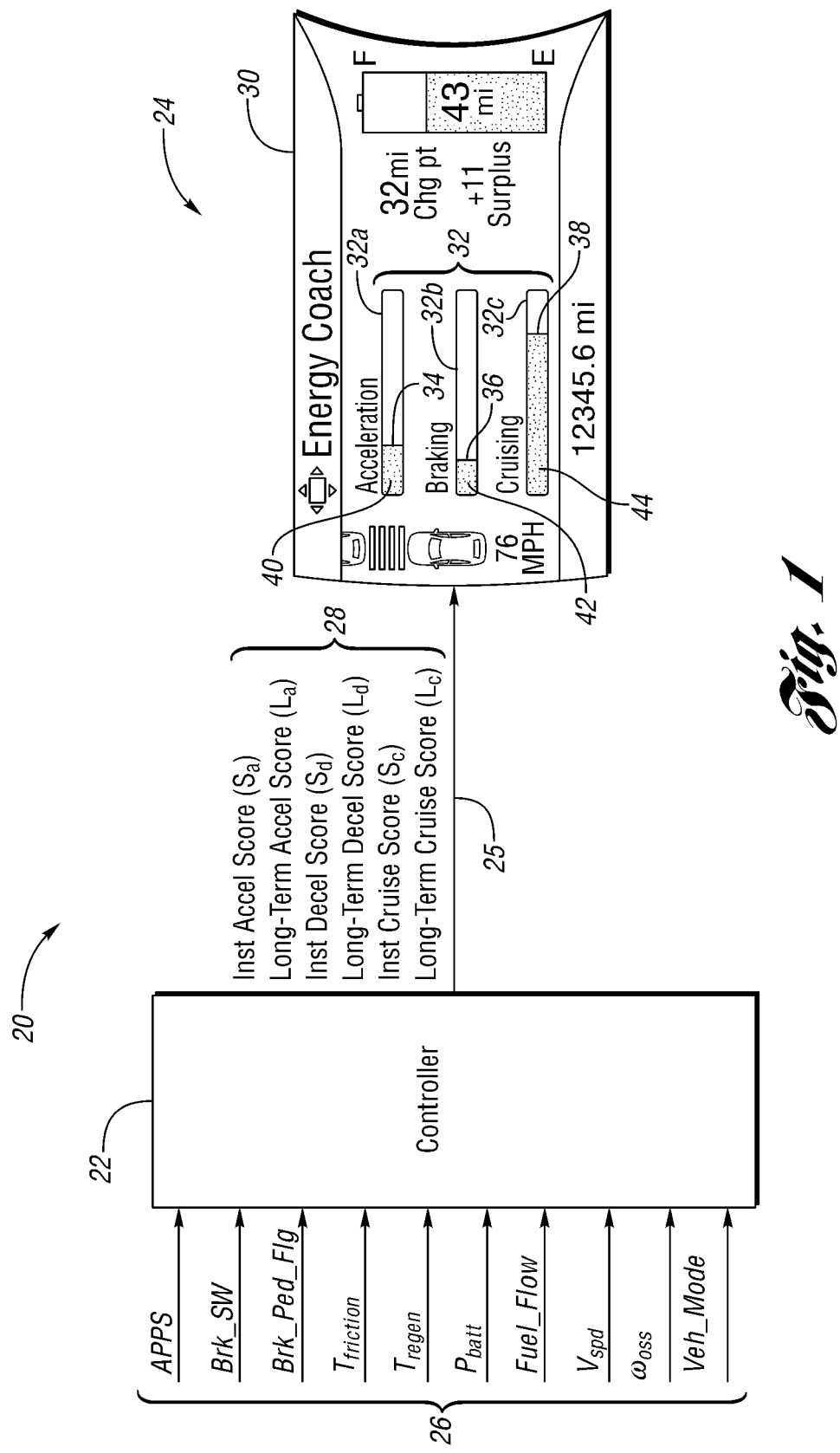
FIG. 1 is a high-level, functional diagram of a vehicle control system for coaching driving behavior in accordance with one or more embodiments of the present application.

Referring now to the drawings, FIG. 1 depicts a high-level, functional diagram of a control system 20 for a vehicle (not shown) for coaching driving behavior in accordance with one or more embodiments of the present application. The control system 20 may include a controller 22 and a user interface 24 that are in communication with each other. Although it is shown as a single controller, the controller 22 may include multiple controllers that may be used to control multiple vehicle systems. For example, the controller 22 may be a vehicle system controller/powertrain control module (VSC/PCM). In this regard, the PCM portion of the VSC/PCM may be software embedded within the VSC/PCM, or it can be a separate hardware device. The controller 22 generally includes any number of microprocessors, ASICs, ICs, memory (e.g., FLASH, ROM, RAM, EPROM and/or EEPROM) and software code to co-act with one another to perform a series of operations. The controller 22 may communicate with other controllers (e.g., a battery energy control module, transmission control module, etc.) and the user interface 24 over a hardline vehicle connection, such as a BUS 25, using a common bus protocol (e.g., CAN), or may communicate wirelessly with other vehicle devices using a wireless transceiver (not shown).

The controller 22 may receive input signals 26 and may generate one or more instantaneous and/or long-term driving behavior feedback signals 28 in response to the input signals 26. The controller 22 may transmit this information to the user interface 24, which in turn conveys the information to the driver. The driver may then use the driving behavior feedback to improve driving habits, such as those relating to acceleration, deceleration and cruising.

The user interface 24 may include at least one display 30 and associated circuitry, including hardware and/or software, necessary to communicate with the controller 22 and operate the display. The display 30 may be generally used to convey relevant vehicle content to a driver of the vehicle including, for example, driving behavior information or other information relating to the operation of the vehicle.

The display 30 may be disposed within a dashboard (not shown) of the vehicle, such as in an instrument panel or center console area. Moreover, the display 30 may be part of another user interface system, such as a navigation system, or may be part of a dedicated information display system. The display 30 may be a liquid crystal display (LCD), a plasma display, an organic light emitting display (OLED), or any other suitable display. The display 30 may include a touch screen for receiving driver input associated with selected areas of the display. The user interface 24 or display 30 may also include one or more buttons (not shown), including hard keys or soft keys, for effectuating driver input.

The driving behavior feedback signals 28 generated by the controller 22 may correspond to a score or other relative metric that may be used to evaluate aspects of a driver's driving behavior, such as acceleration behavior, deceleration (braking) behavior and cruising speed behavior. According to one or more embodiments, the driving behavior feedback signals 28 may include one or more of the following driving behavior scores: an instantaneous acceleration score ($S_a$), a long-term acceleration score ($L_a$), an instantaneous deceleration score ($S_d$), a long-term deceleration score ($L_d$), an instantaneous cruising speed score ($S_c$), and a long-term cruising speed score ($L_c$).

The display 30 may include one or more driving behavior feedback gauges 32 for conveying the various driving behavior feedback scores. In particular, the display 30 may include an acceleration feedback gauge 32a associated with the instantaneous acceleration score ($S_a$) and/or the long-term acceleration score ($L_a$). The display 30 may further include a deceleration feedback gauge 32b associated with the instantaneous deceleration score ($S_d$) and/or the long-term deceleration score ($L_d$). Furthermore, the display 30 may include a cruising speed feedback gauge 32c associated with the instantaneous cruising speed score ($S_c$) and/or the long-term cruising speed score ($L_c$). As shown in FIG. 1, each driving behavior feedback gauge 32 may be a bar gauge including at least one feedback indicator corresponding to at least one of the driving behavior feedback signals 28. For instance, the acceleration feedback gauge 32a may include an acceleration feedback indicator 34 corresponding to at least one of the instantaneous acceleration score ($S_a$) and the long-term acceleration score ($L_a$). Similarly, the deceleration feedback gauge 32b may include a deceleration feedback indicator 36 corresponding to at least one of the instantaneous deceleration score ($S_d$) and the long-term deceleration score ($L_d$). The cruising speed feedback gauge 32c may include a cruising speed feedback indicator 38 corresponding to at least one of the instantaneous cruising speed score ($S_c$) and the long-term cruising speed score ($L_c$). Each feedback indicator may define a corresponding bar segment illuminated or otherwise displayed by the display 30. Accordingly, the driving behavior score corresponding to each feedback indicator may define the length of its associated bar segment. For example, the acceleration feedback indicator 34 may define an acceleration bar segment 40 on the acceleration feedback gauge 32a, the deceleration feedback indicator 36 may define a deceleration bar segment 42 on the deceleration feedback gauge 32b, and the cruising speed feedback indicator 38 may define a cruising speed bar segment 44 on the cruising speed feedback gauge 32c. Although each driving behavior feedback gauge 32 may be implemented using a bar gauge or similar graphic, various alternate types of gauges and/or indicators may also be employed to convey the driving behavior scores. Some non-limiting examples may include numerical indicators, needle gauges, and the like.

One or more embodiments of the present application may be implemented in all types of vehicles, including vehicles having different powertrain configurations. For example, one or more embodiments may be implemented in hybrid electric vehicles (HEVs), plug-in hybrid electric vehicles (PHEVs), battery electric vehicles (BEVs), or conventional vehicles, such as those powered solely by an internal combustion engine. HEVs may refer to vehicles powered by an engine and/or one or more electric motors. BEVs may refer to all-electric vehicles propelled by one or more electric motors without assistance from an internal combustion engine. PHEVs may refer to hybrid electric vehicles primarily powered by one or more electric motors. PHEVs and BEVs may be connected to an external power supply for charging a vehicle battery that supplies electrical power to the motors.

In order to provide one or more of the driving behavior feedback signals 28 referenced above, one or more of the input signals 26 received by the controller 22 may be generally indicative of vehicle speed ($V_{spd}$), actual vehicle acceleration ($A_{actual}$), and/or actual vehicle deceleration ($D_{actual}$). In addition, one or more of the input signals 26 may be generally indicative of total powertrain output power ($P_{total}$), accelerator pedal position change ($\Delta Acc\_Ped$) and/or braking percentage (Pct_Brk). The input signals 26 received by the controller 22 may be used in one or more algorithms contained within, or otherwise executed by, the controller 22 for determining input values such as vehicle acceleration ($A_{actual}$), deceleration ($D_{actual}$), total powertrain output power ($P_{total}$), accelerator pedal position change ($\Delta Acc\_Ped$) and/or braking percentage (Pct_Brk). Although generally described as inputs received directly by the controller 22, one or more of the input signals 26 may be merely indicative of inputs generally used in controller algorithms for generating the driving behavior feedback. To this end, exemplary input signals may include an accelerator pedal position signal (APPS), a brake switch signal (Brk_SW) and/or a brake pedal flag signal (Brk_Ped_Flg), friction braking torque ($T_{friction}$), regenerative braking torque ($T_{regen}$), high-voltage (HV) battery power ($P_{batt}$), fuel flow rate (Fuel_Flow), vehicle speed ($V_{spd}$) or output shaft speed ($\omega_{oss}$), vehicle mode (Veh_Mode), and the like.

The inputs may be received directly as input signals from individual systems or sensors (not shown), or indirectly as input data over the CAN bus 25. The input signals 26 received by the controller 22 may be dependent on the powertrain technology employed in a particular vehicle. For instance, in conventional vehicle applications, the input signals relating to the HV battery power ($P_{batt}$) or regenerative braking torque ($T_{regen}$), for example, may not be present or applicable in generating the driving behavior feedback signals 28. Similarly, in BEV applications, an input signal corresponding to the fuel flow rate (Fuel_Flow) would not be applicable.

The controller 22 may determine the actual vehicle acceleration ($A_{actual}$) and deceleration ($D_{actual}$) from the actual vehicle speed ($V_{spd}$) or output shaft speed ($\omega_{oss}$). The controller 22 may determine the total powertrain output power ($P_{total}$) a number of ways depending upon the powertrain configuration. For instance, the total powertrain output power ($P_{total}$) in HEV and PHEV applications may be the sum of the battery power ($P_{batt}$) from a high voltage battery and fuel power ($P_{fuel}$) as set forth below:

$$P_{total}=P_{batt}+P_{fuel} \quad \text{Eq. 1}$$

The fuel power ($P_{fuel}$) may be calculated using the value from the fuel flow rate (Fuel_Flow) and a fuel density (Fuel_Density) according to Eq. 2 set forth below:

$$P_{fuel}=\text{Fuel\_Flow} \times \text{Fuel\_Density} \quad \text{Eq. 2}$$

In BEV applications, however, the total powertrain output power ($P_{total}$) may be based solely on the battery power ($P_{batt}$):

$$P_{total}=P_{batt} \quad \text{Eq. 3}$$

In conventional powertrain applications, the total powertrain output power ($P_{total}$), may be based solely on the fuel power ($P_{fuel}$):

$$P_{total}=P_{fuel} \quad \text{Eq. 4}$$

The controller 22 may determine the accelerator pedal position change ($\Delta Acc\_Ped$) from the accelerator pedal position signal (APPS), which may represent a driver request for wheel torque/power. Therefore, the accelerator pedal position change ($\Delta Acc\_Ped$) may be indicative of the driver's accelerator pedal response.

Figure 2:
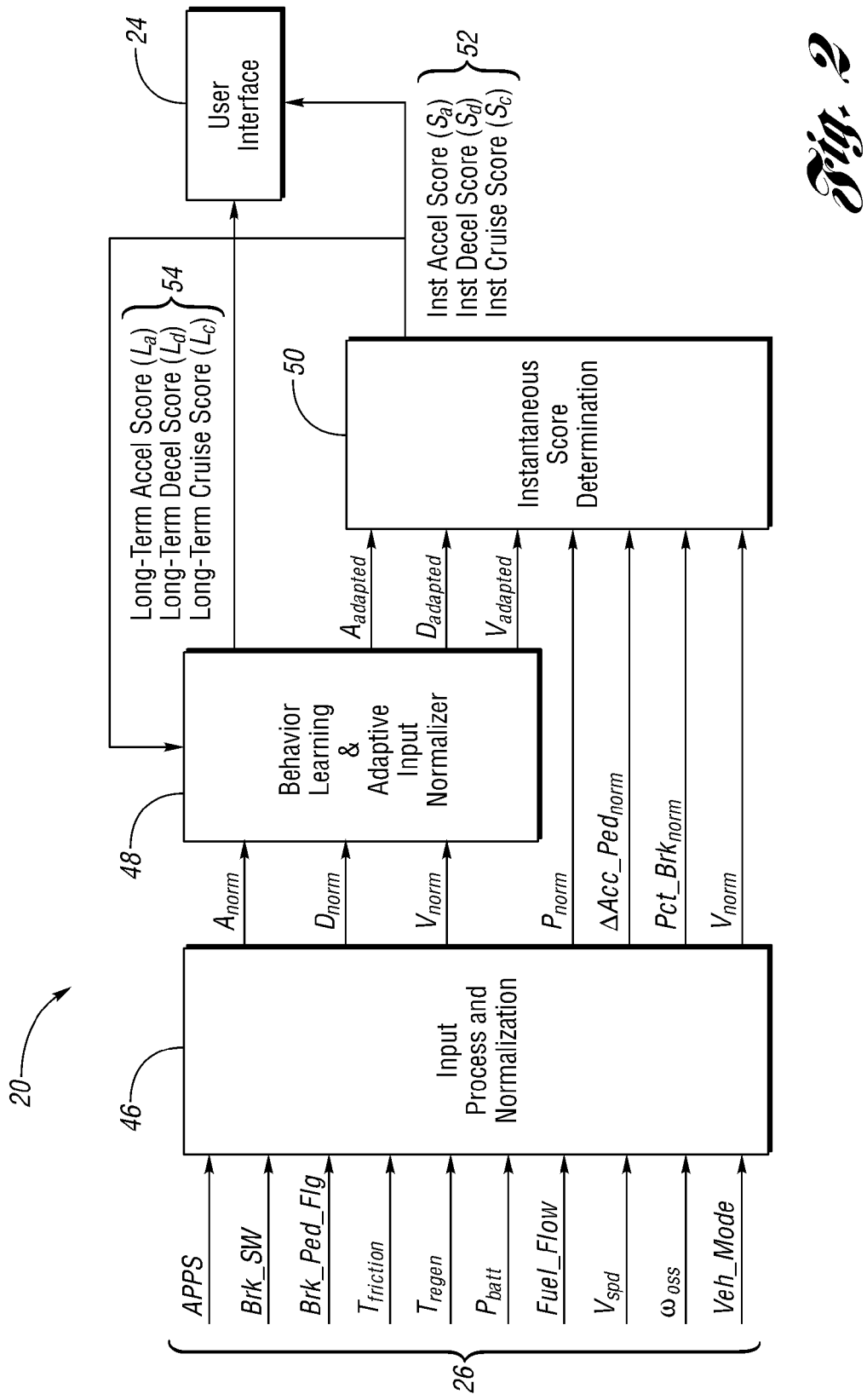
FIG. 2 is an exemplary, functional block diagram of the control system in greater detail.

FIG. 2 is an exemplary, functional block diagram of the control system 20 in greater detail. As seen therein, the controller 22 may include a plurality of interrelated algorithms, represented as distinct blocks, for generating the driving behavior feedback signals 28. Although several of the interrelated algorithms have been divided up schematically in FIG. 2 for illustrative purposes, they me be combined into one larger algorithm for generating the driving behavior feedback signals 28 transmitted to the user interface 24. As shown in FIG. 2, the input signals 26 described with respect to FIG. 1 may be generally received at an input process and normalization block 46. Within the input process and normalization block 46, one or more of the input signals 26 may be processed to obtain the values for vehicle acceleration ($A_{actual}$), deceleration ($D_{actual}$), total powertrain output power ($P_{total}$), accelerator pedal position change ($\Delta Acc\_Ped$), braking percentage (Pct_Brk) or the like, as described above. Moreover, the vehicle acceleration ($A_{actual}$) and deceleration ($D_{actual}$) may be modified as a function of vehicle speed ($V_{spd}$) to obtain a normalized acceleration value ($A_{norm}$) and a normalized deceleration value ($D_{norm}$), respectively.

The total powertrain output power ($P_{total}$) may also be modified as a function of vehicle speed ($V_{spd}$) to generate a normalized total powertrain output power value ($P_{norm}$). Similarly, the accelerator pedal position change ($\Delta Acc\_Ped$) may also be modified as a function of vehicle speed ($V_{spd}$) to obtain a normalized accelerator pedal position change value ($\Delta Acc\_Ped_{norm}$). In some instances, the vehicle speed ($V_{spd}$) itself may be normalized to obtain a normalized vehicle speed ($V_{norm}$).

Like the total powertrain output power, the controller 22 may determine braking percentage (Pct_Brk) differently based on the powertrain configuration. For HEVs, PHEVs, and BEVs, the braking percentage (Pct_Brk) may be based upon a ratio of regenerative braking torque ($T_{regen}$) to the sum of friction braking torque ($T_{friction}$) and regenerative braking torque ($T_{regen}$). For instance, the braking percentage (Pct_Brk) may be determined by a filtered unity minus the aforementioned ratio, as set forth in Eq. 5 below:

$$\text{Pct\_Brk} = 1 - \frac{T_{regen}}{T_{friction} + T_{regen}} \quad \text{Eq. 5}$$

In general, a relatively low braking percentage may indicate that braking is mostly done with regenerative braking.

Conversely, a relatively high braking percentage may indicate that braking is mostly done with friction braking.

For conventional vehicles, the braking percentage (Pct_Brk) may be determined from one or more of the brake pedal signals (e.g., Brk_SW and/or Brk_Ped_Flg). As understood by one of ordinary skill in the art, the brake switch signal (Brk_SW) may be an input that indicates when the brake pedal is first being pressed. The brake pedal flag signal (Brk_Ped_Flg) may be a redundant brake pedal input that indicates when the brake pedal is being pressed beyond a point signaled by the brake switch signal (Brk_SW). In some applications, only one brake pedal signal may be available and, thus, the signals may be substituted for one another. According to one or more embodiments, the braking percentage (Pct_Brk) in conventional vehicles may be a slowly filtered weighted sum of the brake pedal switches. In general, if one of the brake pedal switches is active, the braking percentage may be relatively low; if two of the brake pedal switches are active, then the braking percentage may be relatively high. The braking percentage (Pct_Brk) may also be modified as a function of vehicle speed ($V_{spd}$) to obtain a normalized braking percentage value (Pct_Brk$_{norm}$).

The acceleration, deceleration, vehicle speed, total powertrain output power, accelerator pedal position change and braking percentage may be normalized with respect to vehicle speed because a vehicle may behave differently at lower speeds than it does at higher speeds. Moreover, the system may want to account for the vehicle speed when determining the driving behavior feedback signals 28. For instance, the system may want to deemphasize a driver's pedal response at low speeds. Accordingly, the controller 22 may calculate the normalized accelerator pedal position change ($\Delta Acc\_Ped_{norm}$) to adjust for vehicle speed. Also, the maximum total powertrain output power ($P_{max}$) may generally be lower at lower speeds and the maximum vehicle acceleration ($A_{max}$) may generally be higher at lower speeds. Normalization of these input values can allow for the system to take vehicle speed into account when providing driving behavior feedback.

The controller 22 may further include a behavior learning and adaptive input normalizer block 48 and an instantaneous score determination block 50. The normalized outputs of the input process and normalization block 46 may become inputs to the behavior learning and adaptive input normalizer block 48 and/or the instantaneous score determination block 50. At the behavior learning and adaptive input normalizer block 48, the controller 22 may monitor a driver's instantaneous driving behavior via one or more instantaneous driving behavior feedback signals 52 (e.g., the instantaneous acceleration score ($S_a$), the instantaneous deceleration score ($S_d$), or the instantaneous cruising score ($S_c$)) output by the instantaneous score determination block 50. The instantaneous driving behavior feedback signals 52 may also be transmitted to the user interface 24. The controller 22 may evaluate the driver's general acceptance or rejection of short-term driving behavior feedback based on the instantaneous driving behavior feedback signals 52. In this manner, the controller 22 may learn or adapt to the driver's long-term driving behavior intentions based upon whether the driver is responsive to the feedback or generally ignores the feedback.

Moreover, the controller 22 may generate one or more long-term driving behavior feedback signals 54 (e.g., the long-term acceleration score ($L_a$), the long-term deceleration score ($L_d$), or the long-term cruising score ($L_c$)), which may be transmitted to the user interface 24. Additionally, the long-term driving behavior feedback signals 54 may be used to further modify the normalized inputs for acceleration, deceleration and vehicle speed. For example, in one or more embodiments, the controller 22 may adapt the normalized acceleration input ($A_{norm}$) based on whether the driver is responsive to driving acceleration behavior feedback. In this regard, the normalized acceleration ($A_{norm}$) may be multiplied by the long-term acceleration score ($L_a$) at the behavior learning and adaptive input normalizer block 48 to generate an adapted normalized acceleration value ($A_{adapted}$). The controller 22 may also modify the normalized inputs for deceleration and/or vehicle speed in a similar manner at the behavior learning and adaptive input normalizer block 48 to generate an adapted normalized deceleration ($D_{adapted}$) and an adapted normalized vehicle speed ($V_{adapted}$), respectively.

In general, the system may convey short-term and/or long-term driving behavior feedback during particular driving behavior events. For instance, the system may convey driving acceleration behavior feedback when the controller 22 determines that a qualifying acceleration event is occurring or has just occurred. According to one or more embodiments, the controller 22 may detect the occurrence of an acceleration event when accelerator pedal position is above a pedal position threshold, vehicle speed is above a speed threshold, and vehicle acceleration is above an acceleration threshold. The system may convey braking deceleration behavior feedback when the controller 22 determines that a qualifying deceleration (braking) event is occurring or has just occurred. According to one or more embodiments, the controller 22 may detect the occurrence of a deceleration event when the braking percentage is above a braking percentage threshold, vehicle speed is above a speed threshold, and vehicle deceleration is above a deceleration threshold. The system may convey cruising speed behavior feedback when the controller 22 determines that a cruising event is occurring. The controller 22 may detect the occurrence of a cruising event when no acceleration or deceleration events are occurring and the vehicle speed is above a minimum speed threshold. According to one or more embodiments, the controller 22 may convey cruising speed behavior feedback when the vehicle acceleration is below an acceleration threshold and the vehicle deceleration is below a deceleration threshold. The long-term driving behavior feedback signals 54 may be used to further modify or adapt the normalized inputs for acceleration, deceleration and vehicle speed, as described above, when an acceleration event, a deceleration event, or a cruising event is detected.

The adapted normalized acceleration ($A_{adapted}$) can be used in calculating future instantaneous acceleration scores ($S_a$). To this end, the adapted normalized acceleration ($A_{adapted}$) may be received as an input to the instantaneous score determination block 50. Similarly, the adapted normalized deceleration ($D_{adapted}$) and adapted normalized vehicle speed ($V_{adapted}$) can be used in calculating future instantaneous deceleration scores ($S_d$) and instantaneous cruising scores ($S_c$), respectively. Accordingly, the adapted normalized deceleration ($D_{adapted}$) and adapted normalized vehicle speed ($V_{adapted}$) may also be received as inputs to the instantaneous score determination block 50. As shown, the instantaneous score determination block 50 may also receive additional inputs that may be used to calculate the instantaneous driving behavior scores. For example, the normalized total powertrain output power ($P_{norm}$), the normalized accelerator pedal position change ($\Delta Acc\_Ped_{norm}$), the normalized braking percentage (Pct_Brk$_{norm}$), and the normalized vehicle speed ($V_{norm}$) may be inputs to the instantaneous score determination block 50.

According to one or more embodiments of the present application, the instantaneous score determination block 50 may include a fuzzy logic controller and/or algorithm for generating one or more of the instantaneous driving behavior feedback signals 52. As previously described, the instantaneous driving behavior feedback signals 52 may be received at the behavior learning and adaptive input normalizer block 48 in order to evaluate the driver's general acceptance or rejection of the driving behavior feedback and provide long-term driving behavior feedback signals 54 to the user interface 24. In one or more embodiments, the instantaneous driving behavior feedback signals 52 may also be transmitted to the user interface 24 for display purposes along with the long-term driving behavior feedback signals 54.

Figure 3:
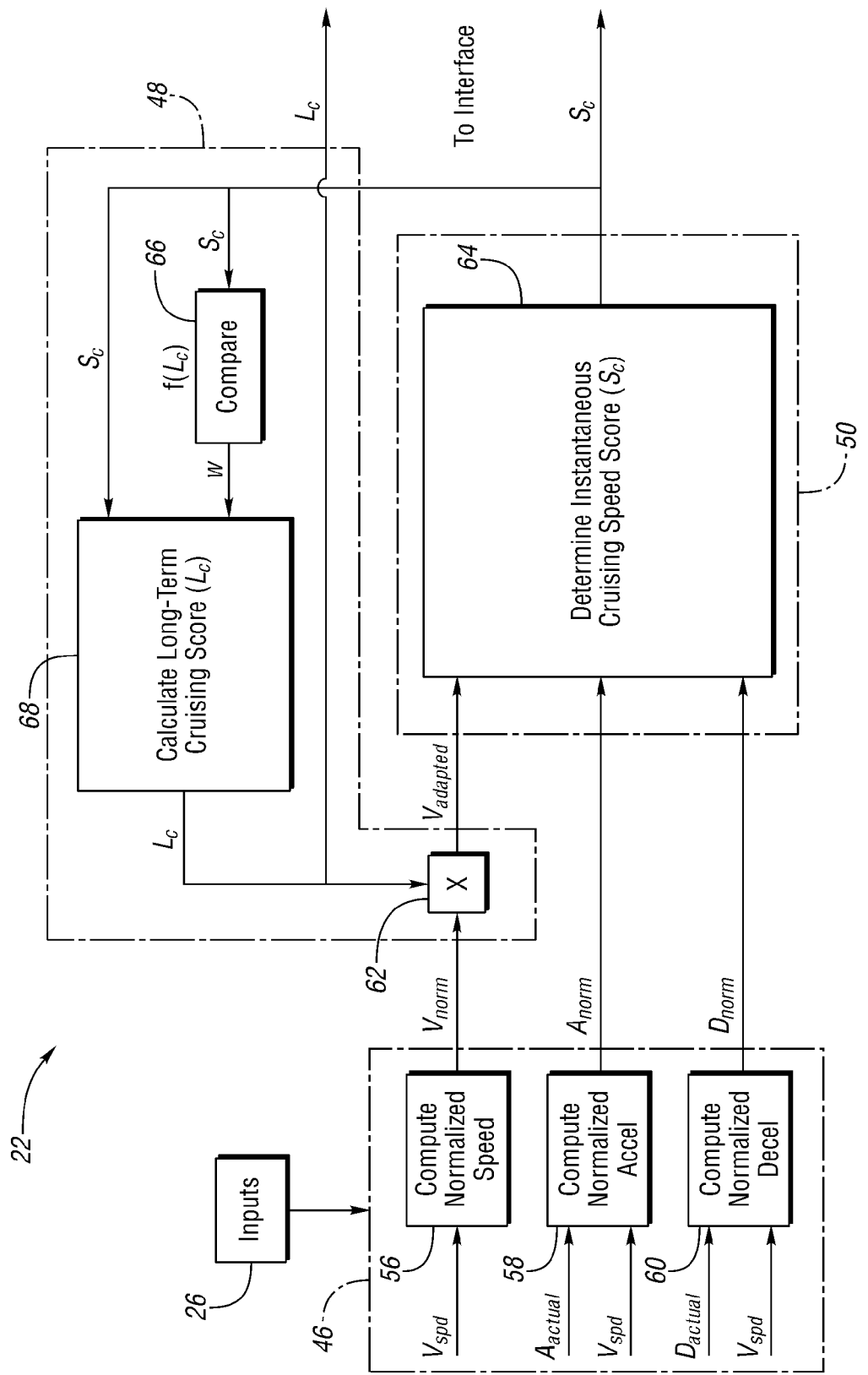
FIG. 3 is a simplified, schematic block diagram of the controller and related algorithms generally described in FIG. 2 for use in coaching cruising speed behavior.

FIG. 3 illustrates a simplified, schematic block diagram of the controller algorithms generally described in FIG. 2 for use in coaching cruising speed behavior. As shown, the controller 22 may generally include the input process and normalization block 46, the behavior learning and adaptive input normalizer block 48, and the instantaneous score determination block 50. At the input process and normalization block 46, the controller 22 may receive one or more of the input signals 26. As previously described, the one or more input signals 26 may be indicative of the vehicle acceleration ($A_{actual}$), vehicle deceleration ($D_{actual}$), and vehicle speed ($V_{spd}$). Moreover, the vehicle acceleration, deceleration and speed may each be normalized as a function of the vehicle speed. In this regard, the controller 22 may compute the normalized vehicle speed ($V_{norm}$) at block 56 in response to the vehicle speed input ($V_{spd}$). The controller 22 may compute the normalized acceleration ($A_{norm}$) at block 58 in response to the acceleration ($A_{actual}$) and vehicle speed ($V_{spd}$) inputs. In order to compute the normalized acceleration ($A_{norm}$), the controller 22 may determine a maximum acceleration ($A_{max}$) value for the vehicle at the current vehicle speed. The maximum acceleration may be obtained in any number of ways as would be understood by one of ordinary skill in the art (e.g., a look-up table, an acceleration curve, etc.). Once the maximum acceleration ($A_{max}$) is determined, the normalized acceleration ($A_{norm}$) may be computed by dividing the actual acceleration ($A_{actual}$) by the maximum acceleration ($A_{max}$):

$$A_{norm} = \frac{A_{actual}}{A_{max}} \qquad \text{Eq. 6}$$

The controller 22 may compute the normalized deceleration ($D_{norm}$) at block 60 in response to the deceleration ($D_{actual}$) and vehicle speed ($V_{spd}$) inputs. In order to compute the normalized deceleration ($D_{norm}$), the controller 22 may determine a maximum deceleration ($D_{max}$) value for the vehicle at the current vehicle speed. The maximum deceleration may be obtained in any number of ways as would be understood by one of ordinary skill in the art (e.g., a look-up table, a deceleration curve, etc.). Once the maximum deceleration ($D_{max}$) is determined, the normalized deceleration ($D_{norm}$) may be computed by dividing the actual deceleration ($D_{actual}$) by the maximum deceleration ($D_{max}$):

$$D_{norm} = \frac{D_{actual}}{D_{max}} \qquad \text{Eq. 7}$$

As previously described, the cruising speed behavior feedback may generally be provided during vehicle cruising events (e.g., when vehicle acceleration and deceleration are relatively low). Accordingly, the long-term cruising speed behavior feedback signal may be used to further modify the normalized input for vehicle speed ($V_{norm}$) when the vehicle acceleration is below an acceleration threshold and the vehicle deceleration is below a deceleration threshold. To this end, the normalized vehicle speed ($V_{norm}$) generated at block 56 may be multiplied by the long-term cruising speed score ($L_c$) at multiplication junction 62 to produce the adapted normalized vehicle speed ($V_{adapted}$). The algorithm for generating the long-term cruising speed score ($L_c$) is described in greater detail below. The controller 22 may determine the instantaneous cruising speed score ($S_c$) at block 64. The adapted normalized vehicle speed ($V_{adapted}$), output from multiplication junction 62, may be an input to the instantaneous cruising speed score determination block 64. The normalized acceleration ($A_{norm}$) and the normalized deceleration ($D_{norm}$) may also be inputs to the instantaneous cruising speed score determination block 64.

According to one or more embodiments of the present application, the instantaneous cruising speed score ($S_c$) may be transmitted to the user interface 24 and displayed via the display 30. Additionally, the instantaneous cruising speed score ($S_c$) may be compared to a function of the long-term cruising speed score ($f(L_c)$) at block 66. Since the long-term cruising speed score ($L_c$) may be based on the instantaneous cruising speed score ($S_c$), the controller 22 can determine whether the driver's instantaneous cruising speed behavior will generally increase or decrease the long-term cruising speed score ($L_c$). Further, the controller 22 may select a forgetting factor (w) based on the comparison between the instantaneous cruising speed score ($S_c$) and the function of the long-term cruising speed score ($L_c$). For instance, if the instantaneous cruising speed score ($S_c$) is greater than the long-term cruising speed score ($L_c$), then it may be determined that the long-term cruising speed score ($L_c$) will be increasing. If the long-term cruising speed score ($L_c$) will be increasing, the controller 22 may output an increasing forgetting factor ($w_i$) at comparison block 66. On the other hand, if the instantaneous cruising speed score ($S_c$) is less than the long-term cruising speed score ($L_c$), then it may be determined that the long-term cruising speed score ($L_c$) will be decreasing. In this case, the controller 22 may output a decreasing forgetting factor ($w_d$) at comparison block 66. Once the appropriate forgetting factor (w) is determined, the controller 22 may calculate a new long-term cruising speed score ($L_c$) at block 68 based upon the previous long-term cruising speed score, the instantaneous cruising speed score, and the applicable forgetting factor. According to one or more embodiments of the present application, the new long-term cruising speed score may be calculated according to Eq. 8 shown below:

$$L_{c(n)} = L_{c(n-1)}(w) + S_c(1-w) \qquad \text{Eq. 8}$$

Where:
$L_{c(n)}$=the new long-term cruising speed score
$L_{c(n-1)}$=the previous long-term cruising speed score
$S_c$=the instantaneous cruising speed score
w=the forgetting factor (e.g., $w_i$ or $w_d$)

The term "long-term" in the long-term cruising speed score ($L_c$) may be a relative one. With respect to the instantaneous cruising speed score ($S_c$), the long-term cruising speed score ($L_c$) may provide drivers with relatively long-term feedback on their driving behavior. In this regard, the long-term cruising speed score ($L_c$) may reflect overall cruising speed behavior over a moving period of several seconds to several minutes or even hours. The value of the forgetting factor (w) may be chosen to reflect the length of the moving period. The higher the forgetting factor, the greater the weight that may be placed on the long-term cruising speed score ($L_c$). According to one or more embodiments, the increasing forgetting factor ($w_i$)

may be set greater than the decreasing forgetting factor ($w_d$) so that the instantaneous cruising speed score ($S_c$) may have less impact on the long-term cruising speed score ($L_c$) when the long-term cruising speed score is increasing (i.e., $L_c < S_c$).

An increasing long-term cruising speed score ($L_c$) may be an indication that the driver is accepting or otherwise responding to the cruising speed behavior feedback. A decreasing long-term cruising speed score ($L_c$) may provide an indication that the driver is generally rejecting or otherwise ignoring the cruising speed behavior feedback. If the driver generally ignores the cruising speed behavior feedback, such that over time the driver may have a relatively low long-term cruising speed score ($L_c$), then the system may adapt the cruising speed behavior feedback it provides so as to be less critical of inefficient cruising speed behavior. Stated differently, the feedback conveyed by the system for relatively inefficient cruising events may not be as penal or otherwise adversely affect the long-term cruising speed score ($L_c$) for drivers that tend not to heed the cruising speed behavior coaching, as compared to drivers with traditionally good cruising speed behavior. Thus, if the driver is generally receptive to the cruising speed behavior feedback by modifying his or her cruising speed behavior accordingly, then the system may be more sensitive with respect to future cruising events in order to continue encouraging further behavior modification. To this end, the controller 22 may use the long-term cruising speed score ($L_c$) to adapt the normalized vehicle speed input to the instantaneous cruising speed score determination block 64 so that the cruising speed behavior feedback is more critical of, or responsive to, relatively efficient drivers. As previously described, the normalized vehicle speed input ($V_{norm}$) may be multiplied by the long-term cruising speed score ($L_c$) at multiplication junction 62 to generate the adapted normalized vehicle speed input ($V_{adapted}$).

According to one or more embodiments of the present application, the instantaneous cruising speed score ($S_c$) may be generated at block 64 based at least upon the adapted normalized vehicle speed ($V_{adapted}$), the normalized acceleration ($A_{norm}$), and the normalized deceleration ($D_{norm}$). For example, the system may generate the instantaneous cruising speed score ($S_c$) only when the acceleration and deceleration inputs are below their corresponding thresholds and the vehicle speed is above a speed threshold. Thus, if the controller 22 detects either an acceleration event or a deceleration event based upon the acceleration and deceleration inputs, respectively, the system may not provide any cruising speed behavior feedback. The system may provide positive instantaneous cruising speed behavior feedback when acceleration is relatively low, deceleration is relatively low, and vehicle speed is relatively low though still above a minimum speed threshold. The system may provide negative instantaneous cruising speed behavior feedback when acceleration is relatively low, deceleration is relatively low, and vehicle speed is relatively high. The system may not provide any instantaneous cruising speed behavior feedback when either acceleration or deceleration is relatively high, regardless of vehicle speed, or the vehicle speed is below a speed threshold. According to one or more embodiments, a look-up table stored in memory may be used to generate the instantaneous cruising speed score ($S_c$) based upon the adapted normalized vehicle speed ($V_{adapted}$).

Once determined, the instantaneous cruising speed score ($S_c$) may be transmitted to the user interface 24 and conveyed to a driver using display 30. The instantaneous cruising speed score ($S_c$) may be conveyed to the driver using the cruising speed feedback gauge 32c. According to one or more embodiments, the location of the cruising speed feedback indicator 38 along the cruising speed feedback gauge 32c may correspond to the instantaneous cruising speed score ($S_c$). Additionally or alternatively, the color of at least a portion of the cruising speed feedback gauge 32c may be associated with the instantaneous cruising speed score ($S_c$). For instance, when the instantaneous cruising speed score ($S_c$) is within a first range, at least a portion of the cruising speed feedback gauge 32c may be displayed in a first color. Further, when the instantaneous cruising speed score ($S_c$) is within a second range, at least a portion of the cruising speed feedback gauge 32c may be displayed in a second color different from the first. Moreover, when the instantaneous cruising speed score ($S_c$) is within a third range, at least a portion of the cruising speed feedback gauge 32c may be displayed in a third color, which may be different from the first and second color. Fewer or greater instantaneous cruising speed score ranges and associated colors may be implemented to convey the instantaneous cruising speed score ($S_c$) in accordance with one or more embodiments of the present application.

Additionally, as previously described, the instantaneous cruising speed score ($S_c$) may be used to calculate the long-term cruising speed score ($L_c$) as set forth above in Eq. 8. The long-term cruising speed score ($L_c$) may be transmitted to the user interface 24 and conveyed to a driver using display 30. The long-term cruising speed score ($L_c$) may be conveyed to the driver using the cruising speed feedback gauge 32c. According to one or more embodiments, the location of the cruising speed feedback indicator 38 along the cruising speed feedback gauge 32c may correspond to the long-term cruising speed score ($L_c$). In this case, the instantaneous cruising speed score ($S_c$) may be conveyed by the user interface 24 in another manner (e.g., the color of at least a portion of the cruising speed feedback gauge 32c), or not at all. Additionally or alternatively, the color of at least a portion of the cruising speed feedback gauge 32c may also be associated with the long-term acceleration score ($L_c$).

FIG. 4 is a simplified, exemplary flow chart 400 depicting a method for conveying cruising speed behavior feedback in accordance with one or more embodiments of the present application. At step 405, the system may receive inputs such as input signals 26. The input signals 26 may be generally indicative of vehicle speed ($V_{spd}$), vehicle acceleration ($A_{actual}$), and/or vehicle deceleration ($D_{actual}$). Exemplary input signals may include an accelerator pedal position signal (APPS), the brake switch signal (Brk_SW), the brake pedal flag signal (Brk_Ped_Flg), friction braking torque ($T_{friction}$) regenerative braking torque ($T_{regen}$), vehicle speed ($V_{spd}$) and/or output shaft speed ($\omega_{oss}$). The system may compute vehicle acceleration ($A_{actual}$), vehicle deceleration ($V_{actual}$), and/or vehicle speed ($V_{spd}$) from the input signals 26 at step 410. The vehicle acceleration ($A_{actual}$) may be calculated from the vehicle speed ($V_{spd}$) and/or output shaft speed ($\omega_{oss}$). The vehicle deceleration ($D_{actual}$) may be calculated from the vehicle speed ($V_{spd}$) and/or output shaft speed ($\omega_{oss}$).

At step 415, the vehicle speed ($V_{spd}$), the vehicle acceleration ($A_{actual}$), and vehicle deceleration ($D_{actual}$) may be normalized. In particular, the vehicle acceleration ($A_{actual}$) and the vehicle deceleration ($D_{actual}$) may be modified as a function of vehicle speed ($V_{spd}$) to obtain the normalized acceleration ($A_{norm}$) and the normalized deceleration ($D_{norm}$), respectively. A normalized value for vehicle speed ($V_{norm}$) may also be computed at step 415. The acceleration and deceleration may be normalized with respect to vehicle speed to adjust for vehicle behavior and operating characteristics at different speeds, as well as account for the vehicle speed when determining the cruising speed behavior feedback.

At step 420, system may determine whether a cruising event has occurred or is occurring. The system may convey cruising speed behavior feedback when a cruising event is detected. As previously described, a cruising event may be deemed to be occurring during the absence of both an acceleration event and a deceleration event (e.g., when acceleration is below an acceleration threshold and deceleration is below a deceleration threshold). If no cruising event is detected, the method may return to step 405 where the input signals 26 can continue to be monitored. If, on the other hand, cruising event is detected at step 420, the method may proceed to step 425.

At step 425, the system may calculate the adapted normalized vehicle speed ($V_{adapted}$). According to one or more embodiments, the normalized vehicle speed input ($V_{norm}$) may be modified based on driver responsiveness to the cruising speed behavior feedback. In this regard, the normalized vehicle speed ($V_{norm}$) may be multiplied by the long-term cruising speed score ($L_c$) to generate the adapted normalized vehicle speed ($V_{adapted}$). At step 430, the system may generate the instantaneous cruising speed score ($S_c$) based upon the adapted normalized vehicle speed ($V_{adapted}$) when the acceleration and deceleration are relatively low. For instance, the instantaneous cruising speed score ($S_c$) may be generated using a look-up table of values for the instantaneous cruising speed score ($S_c$) based on the adapted normalized vehicle speed ($V_{adapted}$). In one or more embodiments, the instantaneous cruising speed score ($S_c$) may be output to the user interface 24 where it may be conveyed to a driver, as provided at step 435. The instantaneous cruising speed score ($S_c$) may be conveyed to the driver using the cruising speed feedback gauge 32c. According to one or more embodiments, the location of the cruising speed feedback indicator 38 along the cruising speed feedback gauge 32c may correspond to the instantaneous cruising speed score ($S_c$). Additionally or alternatively, the color of at least a portion of the cruising speed feedback gauge 32c may be associated with the instantaneous cruising speed score ($S_c$).

Additionally, the instantaneous cruising speed score ($S_c$) may be compared to a function of the long-term cruising speed score ($f(L_c)$) to determine whether the driver's instantaneous cruising speed behavior will increase or decrease the long-term cruising speed score ($L_c$), at step 440. According to one or more embodiments, $f(L_c)$ may be set equal to $L_c$. In this manner, if the instantaneous cruising speed score ($S_c$) is greater than the long-term cruising speed score ($L_c$), the system may conclude that the long-term cruising speed score is increasing. Accordingly, the system may select an increasing forgetting factor ($w_i$) at step 445. If, on the other hand, the instantaneous cruising speed score ($S_c$) is less than the long-term cruising speed score ($L_c$), the system may conclude that the long-term cruising speed score is decreasing. Accordingly, the system may select a decreasing forgetting factor ($w_d$) at step 450. The instantaneous cruising speed score ($S_c$) may be compared to alternative functions of the long-term cruising speed score ($f(L_c)$) to determine whether the driver's instantaneous cruising speed behavior will increase or decrease the long-term cruising speed score ($L_c$). Once the appropriate forgetting factor (w) is selected, the method may proceed to step 455.

At step 455, the system may compute a new long-term cruising speed score ($L_c$). According to one or more embodiments of the present application, the new long-term cruising speed score ($L_c$) may be based upon the previous long-term cruising speed score, the instantaneous cruising speed score ($S_c$), and the selected forgetting factor (w) according to Eq. 8 set forth above. Once calculated, the long-term cruising speed score ($L_c$) may be output to the user interface 24 where it may be conveyed to a driver, as provided at step 460. The long-term cruising speed score ($L_c$) may be conveyed to the driver using the cruising speed feedback gauge 32c. According to one or more embodiments, the location of the cruising speed feedback indicator 38 along the cruising speed feedback gauge 32c may correspond to the long-term cruising speed score ($L_c$). In this case, the instantaneous cruising speed score ($S_c$) may be conveyed by the user interface 24 in another manner (e.g., the color of at least a portion of the cruising speed feedback gauge 32c), or not at all. Additionally or alternatively, the color of at least a portion of the cruising speed feedback gauge 32c may also be associated with the long-term acceleration score ($L_c$).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A control system comprising:
    a controller configured to receive input indicative at least of vehicle acceleration, vehicle deceleration and vehicle speed, and output at least one cruising speed score based upon the input when vehicle acceleration is below an acceleration threshold and vehicle deceleration is below a deceleration threshold; and
    an interface communicating with the controller and configured to display a cruising speed feedback indicator indicative of the at least one cruising speed score.

2. The control system of claim 1, wherein the interface includes a cruising speed feedback gauge for displaying the cruising speed feedback indicator, and wherein the interface is configured to adjust the cruising speed feedback indicator within the cruising speed feedback gauge based on the at least one cruising speed score.

3. The control system of claim 2, wherein the at least one cruising speed score indicated by the cruising speed feedback indicator includes one of a long-term cruising speed score and an instantaneous cruising speed score.

4. The control system of claim 3, wherein the interface is further configured to adjust a color of at least a portion of the cruising speed feedback gauge based on the other of the long-term cruising speed score and the instantaneous cruising speed score.

5. The control system of claim 3, wherein the controller is further configured to generate the instantaneous cruising speed score based upon the vehicle acceleration, the vehicle deceleration and the vehicle speed.

6. The control system of claim 5, wherein the controller is further configured to normalize at least the vehicle acceleration and the vehicle deceleration based upon vehicle speed prior to generating the instantaneous cruising speed score.

7. The control system of claim 5, wherein the controller is further configured to calculate an adapted vehicle speed value prior to generating the instantaneous cruising speed score, the adapted vehicle speed value being based on the vehicle speed and the long-term cruising speed score.

8. The control system of claim 7, wherein the adapted vehicle speed value is calculated by multiplying the vehicle speed by the long-term cruising speed score.

9. The control system of claim 7, wherein the instantaneous cruising speed score is generated based on the adapted vehicle speed value using a look-up table.

10. The control system of claim 3, wherein the long-term cruising speed score is based at least in part upon the instantaneous cruising speed score, a previous long-term cruising speed score, and a forgetting factor for weighting the instantaneous cruising speed score and the previous long-term cruising speed score.

11. The control system of claim 10, wherein the forgetting factor is based on whether the previous long-term cruising speed score is less than the instantaneous cruising speed score.

12. A method for controlling a vehicle display comprising:
receiving input indicative at least of vehicle acceleration, vehicle deceleration and vehicle speed;
generating at least one cruising speed score based upon the input when vehicle acceleration is below an acceleration threshold and vehicle deceleration is below a deceleration threshold; and
displaying a cruising speed feedback gauge having a cruising speed feedback indicator indicative of the at least one cruising speed score.

13. The method of claim 12, wherein the step of generating the at least one cruising speed score comprises:
comparing the vehicle acceleration to the acceleration threshold;
comparing the vehicle deceleration to the deceleration threshold;
generating an instantaneous cruising speed score based upon the vehicle speed when the vehicle acceleration is below the acceleration threshold and the vehicle deceleration is below the deceleration threshold; and
calculating a long-term cruising speed score based on the instantaneous cruising speed score.

14. The method of claim 13, wherein the at least one cruising speed score indicated by the cruising speed feedback indicator includes one of the long-term cruising speed score and the instantaneous cruising speed score.

15. The method of claim 13, further comprising:
normalizing one or more of the vehicle acceleration and the vehicle deceleration based upon vehicle speed prior to generating the instantaneous cruising speed score.

16. The method of claim 13, further comprising:
calculating an adapted vehicle speed value prior to generating the instantaneous cruising speed score, the adapted vehicle speed value being based on the vehicle speed and the long-term cruising speed score.

17. The method of claim 16, wherein the instantaneous cruising speed score is generated based on the adapted vehicle speed value using a look-up table.

18. A display control system comprising:
a controller configured to receive input indicative of vehicle acceleration, vehicle deceleration and vehicle speed, generate an instantaneous cruising speed score based on the input when vehicle acceleration is below an acceleration threshold and vehicle deceleration is below a deceleration threshold, and provide a cruising speed feedback signal corresponding to a long-term cruising speed score based upon the instantaneous cruising speed score; and
a display in communication with the controller and including a cruising speed feedback gauge configured to display a cruising speed feedback indicator indicative of the long-term cruising speed score.

19. The display system of claim 18, wherein the display is further configured to adjust a color of at least a portion of the cruising speed feedback gauge based on the long-term cruising speed score.

* * * * *